United States Patent [19]

Santen

[11] 4,042,103
[45] Aug. 16, 1977

[54] INSTALLATION FOR THE TREATMENT OF CONTAINER-PACKED COMMODITIES

[75] Inventor: Salomon Santen, Amsterdam, Netherlands

[73] Assignee: Stork Amsterdam B.V., Amstelveen, Netherlands

[21] Appl. No.: 696,559

[22] Filed: June 16, 1976

[30] Foreign Application Priority Data

June 19, 1975 Japan ................................ 50-75412

[51] Int. Cl.² ........................................... B65G 17/46
[52] U.S. Cl. ................................... 198/645; 198/704; 21/80; 99/362
[58] Field of Search .............. 198/342, 645, 653, 654, 198/655, 704, 482, 483; 134/48, 75, 86, 128, 134; 21/80; 99/362

[56] References Cited

U.S. PATENT DOCUMENTS

| 981,961 | 1/1911 | Wehmiller et al. | 198/704 |
| 2,867,163 | 1/1959 | Bloom | 198/645 |
| 2,975,882 | 3/1961 | Abbey | 198/342 |
| 3,211,275 | 10/1965 | van der Winden | 198/645 |
| 3,347,351 | 10/1967 | Mencacci et al. | 198/654 |
| 3,501,318 | 3/1970 | Wilson | 99/362 |
| 3,643,787 | 2/1972 | Woof et al. | 198/482 |
| 3,770,104 | 11/1973 | Reimers | 198/654 |
| 3,814,234 | 6/1974 | Santen | 198/704 |
| 3,895,707 | 7/1975 | Anikanov et al. | 198/654 |
| 3,970,188 | 7/1976 | Smorenburg | 198/655 |

FOREIGN PATENT DOCUMENTS

| 1,092,553 | 4/1955 | France | 198/655 |
| 2,010,351 | 9/1970 | Germany | 198/645 |
| 972,147 | 10/1964 | United Kingdom | 198/655 |

*Primary Examiner*—Evon C. Blunk
*Assistant Examiner*—Richard K. Thomson
*Attorney, Agent, or Firm*—Edmund M. Jaskiewicz

[57] ABSTRACT

Installation for the thermal treatment of container-packed commodities, comprising an endless conveyor with carriers for the containers, each carrier having a cover closing its entrance, said cover being shiftable from a locked to an unlocked position and being tiltable over a limited arc in the unlocked position, a retractable abutment being provided for unlocking and opening the cover, while a further abutment is present for relocking and closing the cover.

1 Claim, 10 Drawing Figures

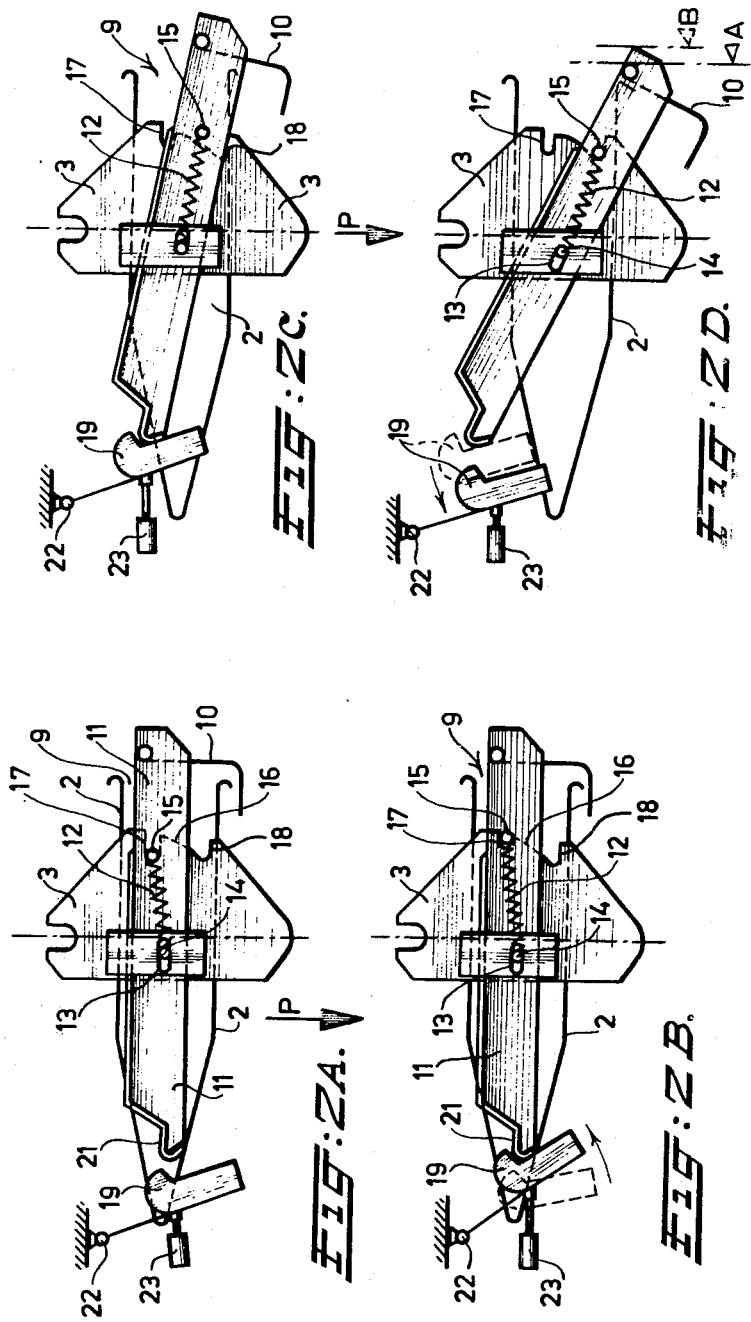

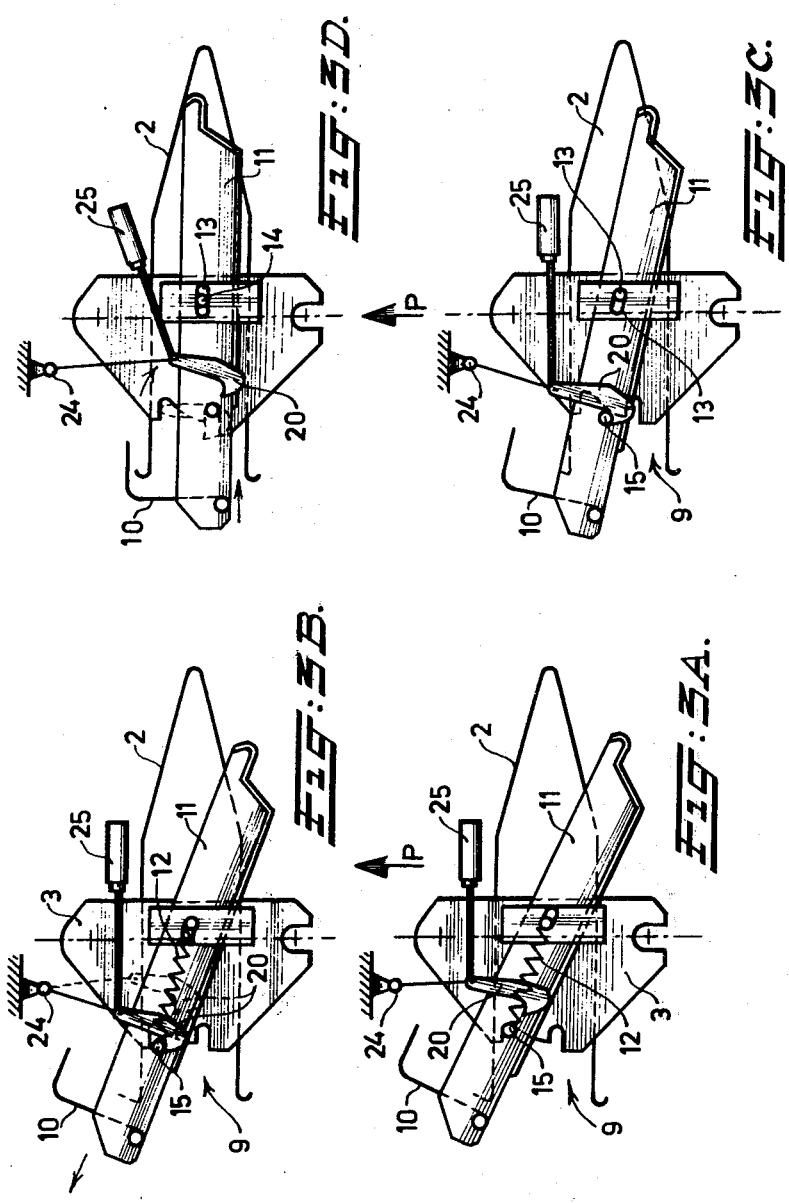

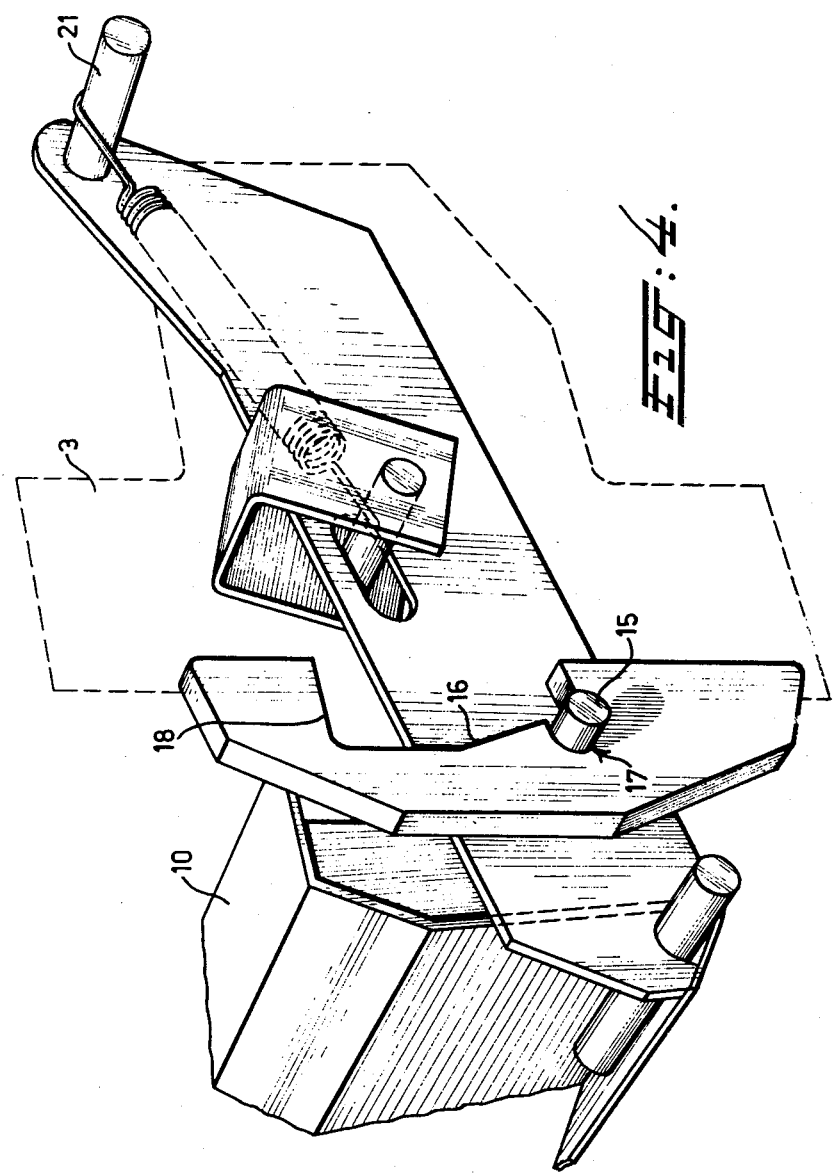

INSTALLATION FOR THE TREATMENT OF CONTAINER-PACKED COMMODITIES

BACKGROUND OF THE INVENTION

The invention relates to an installation for the treatment of container-packed commodities, in particular for the sterilization of pharmaceutical products or the like foodstuff packed in pouches said installation comprising an endless conveyor with carriers for the containers, travelling through a treatment space the conveyor passing subsequently along a discharge station and a loading station lying outside the treatment space.

DISCUSSION OF THE PRIOR ART

Installations of this kind are known in different embodiments, in particular for performing a heat-treatment. Reference is made to U.S. Pat. No. 3,704,774 and to the copending patent applications Ser. No. 397,588 filed on Sept. 14, 1973, now U.S. Pat. No. 3,970,188, 486,207 filed on July 9, 1974 now U.S. Pat. No. 3,986,832 and 519,689 filed Oct. 31, 1974 now U.S. Pat. No. 3,972,679. The invention relates more in particular to an installation in which a carrier for conveying the objects to be heat-treated are of the type in which a horizontal feeding and discharging movement is applied.

The carriers in such installations may have the shape of a gutter or a box with one open side for loading and unloading the containers to be treated. It is often required to close such an opening in order to permit a turning or tilting of the carriers to promote a uniform treatment of the containers accommodated in these carriers. A closure of the open side of the carrier is useful to avoid a falling-out, or drifting out of the containers stored in the carrier.

The invention aims at providing an installation with carriers having an opening which is normally closed by means of a visor or cover, but which is temporarily opened during the passing of the carriers through the unloading station and through the feeding station.

SUMMARY OF THE INVENTION

According to the invention, each carrier is mounted mainly perpendicular to the conveyor while each carrier is provided with a sidewardly directed opening for the passage of containers said opening being closed by a cover mounted near one end of a lever which is pivotally connected to the conveyor with additional means for a limited longitudinal displacement against the action of a resilient element, the pivotal movement being restricted by a cam-member slidable along a cam surface with at least one end recess for locking the cover in its closed and/or its open position respectively, a mainly stationary abutment being provided before the discharge station and beyond the loading station respectively, for engaging a protruding part of the lever in order to first shift the lever longitudinally and thereafter retain the lever so that by the continued travel of the conveyor, the lever is subsequently tilted, so as to move the cover into its open position or into its closed position respectively.

SURVEY OF THE DRAWING

FIGS. 2a–2d show the opening movement of the cover in four different phases.

FIGS. 3a–3d show the closing of the cover, also in four subsequent phases.

FIG. 4 shows a different embodiment of a detail.

DESCRIPTION OF PREFERRED EMBODIMENTS

Figure 1:
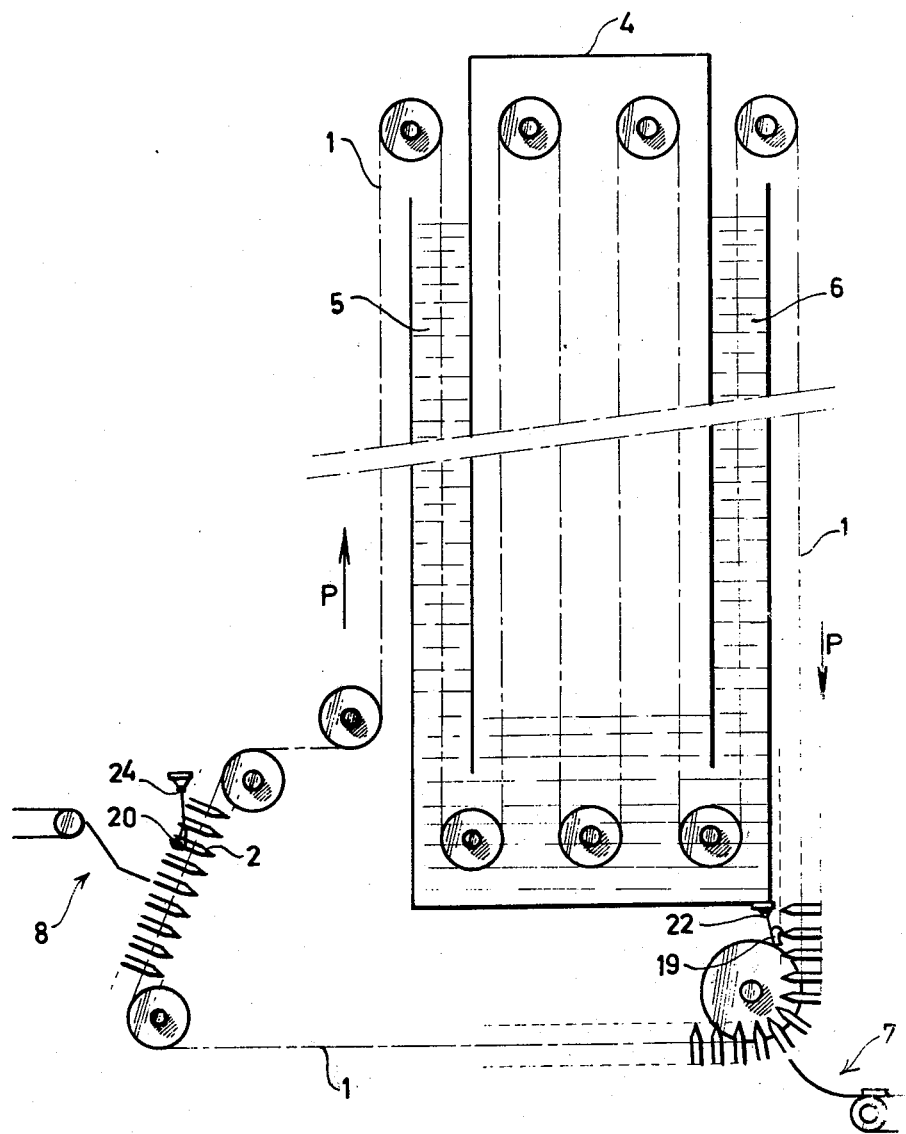
FIG. 1 is an elevational view of a part of an installation for the heat-treatment of pouches, embodying the invention.

The installation partly and schmatically shown in FIG. 1 comprises an endless conveyor 1 with carriers 2 for the containers more in particular for pouches which are bags of plastic material. The conveyor 1 is constituted by two parallel chains as is most commonly used in this type of hydrostatic cookers. Each carrier 2 comprises two mounting plates 3 (see FIGS. 2 and 3) which are mounted upon and secured to the pivot pins of the conveyor chains. The conveyor 1 is travelling through a treatment space 4 and FIG. 1 shows that the path of the conveyor 1 comprises several vertical loops. The conveyor 1 is entering the treatment space 4 through a pressure resisting entry 5 consisting of a vertical column of liquid as described in the abovementioned Pat. No. 3,970,188. The conveyor 1 leaves the treatement space 4 through a same kind of pressure resisting outlet 6. In its path outside the treatment space 4, the conveyor 1 travels along a discharge station 7 and a loading station 8.

Each carrier 2 is mounted mainly perpendicular to the conveyor 1 whilst each carrier is provided with a sidewardly directed opening 9 for the passage of the containers (pouches). This opening is closed by a cover 10 mounted near one end of a lever 11. This lever is pivotally connected to the conveyor 1 with additional means for a limited longitudinal displacement against the action of a resilient element 12, for instance a spring. The additional means consist of an elongated hole 13 bearing on a pivot pin 14. The level 11 is capable of a limited tilting movement around said pivot pin 14.

The lever 11 comprises a cam-member 15 slidable along a cam surface 16 with two end recesses 17 and 18. The cam-member 15 serves at the same time for connecting the spring 12, such that the lever 11 is continuously urged to the left (in FIG. 2) and to the right in the inverted position shown in FIG. 3. Due to the presence of the elongated hole 13, the lever 11 is capable of a limited longitudinal displacement. The tilting or pivotal movement of the lever 11 is restricted by the angular position of the end-recesses 17 and 18 which are at the same time serving to lock the lever 11 in two positions. The first position I of the lever 11, corresponding with the closed position of the cover 10 is shown in the FIGS. 2a, 2b and 3d. The second position II of the lever 11, corresponding with the open position of the cover 10 is represented in the FIGS. 2d and 3a.

The direction of travel of the conveyor 1 is indicated with the arrows P. In the path of the conveyor 1 a mainly stationary abutment 19 is provided before the discharge station 7. A second also mainly stationary abutment 20 is provided beyond the loading station 8. Both abutments are capable of engaging a protruding part of the lever 11, as more clearly shown in the FIGS. 2 and 3. This essential element of the present invention will now be described more in detail referring to the FIGS. 2 and 3 respectively.

FIG. 2 shows the opening of the carrier 2 through a pivotal movement of the lever 11 carrying the cover 10. The four parts 2a–2d of FIG. 2 show subsequent phases of this opening operation which is performed just before reaching the discharge station 7. The abutment 19 is stationary in the direction of travel P of the conveyor 1, but is capable of a short reciprocating movement, mainly perpendicular to the conveyor 1 for engaging the free end 21 of the lever 11. The abutment 19 is connected to a pivot 23 and is further connected to a fluid piston 23 with which the abutment can be placed into two positions, shown in the FIGS. 2b and 2d. In the first or inoperative position shown in FIG. 2a, the lever 11 can pass along the abutment 19. In this situation, the cover 10 closes the opening 9 of the carrier 2 and the lever 11 is locked in the position I due to the engagement of the cam-member 15 into the recess 17 of the cam-surface 16.

In the situation shown in FIG. 2b the fluid piston 23 is energized, and the abutment 19 is shifted in a direction mainly perpendicular to the direction of travel of the conveyor 1, so as to engage the free end 21 of the lever 11 thereby shifting this lever in longitudinal direction. This linear displacement is rendered possible by the elongated hole 13 which is moved along the pivot pin 14 secured to the mounting plate 3. At the same time, the cam-member 15 is leaving the recess 17.

Due to the continued travel of the conveyor 1, the situation shown in FIG. 2c is reached during which the abutment 19 retains the free end 21 of the lever 11. The cam-member 15 travels along the surface 16 and the lever 11 is gradually tilted during which the cover 10 is leaving its closed position I. After having reached the situation shown in FIG. 2d the fluid piston 23 is once again de-energized so that the abutment 19 is retracted. The spring 12 will subsequently move the lever 11 in longitudinal direction so that the cam-member 15 enters into the recess 18. This linear movement is once again rendered possible by means of the elongated hole 13 moving over the pivot pin 14. The cover 10 is now locked in its open position II. The unloading of the carriers 2 can now be performed in the station 7.

After having passed along the discharge 7, the levers 11 remain in their tilted position and the carriers are entering the loading station 8 in a position which is inverted relative to the situation near the discharge station 7. Beyond the loading station 8 the second mainly stationary abutment 20 is provided. This abutment engages a protruding part of the lever 11, which in this case is an extension of the cam-member 15. The abutment 20 serves for performing a tilting movement of the lever 11 back to its perpendicular position, in order to bring the cover 10 back from its open position II to its closed position I. The operation is mainly identical to the functioning of the abutment 19.

The abutment 20 is connected to a pivot 24 and to a fluid piston 25, in order to perform a reciprocating movement.

The abutment 20 has an inoperative position shown in FIG. 3a and an operative position shown in FIG. 3c. In the inoperative position, the carrier 22 can move along the abutment 20 without any engagement between this abutment and the protruding part 15. When the fluid piston 25 is energized, the situation arises which is shown in FIG. 3b. The abutment 20 engages the protruding part 15 and shifts the lever 11 in longitudinal direction against the force of the spring 12. Due to this linear movement of the lever 11, the cam-member 15 is leaving the recess 18. In consequence of the continued travel of the conveyor 1 in the direction P the lever 11 will gradually perform a tilting movement, during which the cam-member 15 is running along the cam-surface 16, vide FIG. 3c. The cover 10 is leaving its open position II and gradually closes the opening 9 of the carrier 2.

After a short travel of the conveyor 1, the situation according to FIG. 3d is arrived, in which the lever 11 is returned to its position perpendicular to the conveyor. The fluid piston 25 is then de-energized so that the abutment 20 returns from its operative to its in-operative position. The spring 12 then draws the lever 11 to the right so that the cam-member 15 will enter into the recess 17. This linear movement of the lever 11 is permitted by the additional means 13, 14 as hereinbefore described. The cover 10 is then returned to its closed position I. The carrier 2 is filled with the product to be sterilized, for instance pouches with a pharmaceutical or edible product. The carriers are then prepared for entering the pressure resisting entry or column 5 in order to be subjected to the intended heat-treatment.

In FIG. 4 an embodiment is shown of the lever 11 with a cover 10, differing in two main aspects from the embodiments shown in the FIGS. 1–3. In the first place the resilient element or spring 12 is not acting on tension, but on compression, which means that the cam-member 15 of the lever 11 is urged by a pushing force of the spring 12 into contact with the cam surface 16. The importance of this feature will be described hereafter. A second different consists in that the cam surface 16 only has one endrecess 17 for locking the lever 11 in its closed position I. In the open position II there is no locking in consequence of the fact that there is only a short travel of the conveyor in this position II of the lever 11.

During the passing of the carriers 2 through the looped path of the conveyor 1 within the treatment space 4, the carriers will be tilted over 180° which means that periodically the containers or pouches will fall against, and rest upon the innerside of the cover 10. If the weight of these containers is greater than the tension in the springs 12, the cam-member 15 may be urged to leave the recess 17 in the embodiment according to the FIGS. 2 and 3. By inverting the position of the cam surface 16 and by transforming the tension spring into a compression spring 12, the weight of the containers resting against the closed cover 10 will increase the locking force of the cam-member 15 into the recess 17, so that there is no risk of this locking to be released, and the lever 11 moving from the position I into the position II with a subsequent undesired falling of the containers out of the carrier 2.

The main feature of the present invention consists in the operation for opening and closing the carriers 2. Both movements are performed by temporarily retaining the lever 11 which is shiftable in longitudinal direction and tiltable over a limited arc. The uninterrupted travel of the conveyor 1 in combination with the temporarily retaining function of the abutments 19 and 20 produces the opening and closing of the carriers 2.

The installation according to the present invention comprises the following additional features:

The carrier 2 has mainly the form of a flat box which is provided at two opposite faces with a mounting plate 3 to be secured to the claims of the conveyor 1, each plate having a protruding pin 14 serving as the pivot for the lever 11 carrying the cover 10 and the cam-member 15 said plate also having the cam-surface 16 with at least one end-recess 17.

The lever 11 has an elongated hole 13 near the middle of its length engaging the pivot pine 14, a spring 12 being mounted between the carrier 2 and the lever 11 for urging the cam-member 15 into permanent contact with the surface 16 on the mounting plate 3.

The abutment 19 is connected to a fluid piston 25 for a reciprocating movement mainly perpendicular to the conveyor 1 for engaging the free end 21 of the lever 11 so as to shift the lever in longitudinal direction against the action of the spring 12.

The abutment 20 is connected to fluid piston 25 for a reciprocating movement mainly perpendicular to the conveyor 1 for engaging an extension of the cam-member 15 so as to shift the lever 11 in longitudinal direction against the action of the spring 12.

What I claim is:

1. Installation for the treatment of container-packed commodities, in particular for the sterilization of pharmaceutical products or the like foodstuff packed in pouches, said installation comprising an endless conveyor with carriers for the containers, travelling through a treatment space, the conveyor passing subsequently along a discharge station and a loading station lying outside the treatment space, wherein each carrier (2) is mounted mainly perpendicular to the conveyor(1) whilst each carrier is provided with a sidewardly directed opening (9) for the passage of the containers, said opening being closed by a cover (10) mounted near one end of a lever (11) which is pivotally connected to the conveyor with additional means for a limited longitudinal displacement against the action of a resilient element (12), the pivotal movement being restricted by a cam-member (15) slidable along a cam surface (16) with at least one end recess (17, 18) for locking the cover in at least one of both its end positions (I, II), a mainly stationary abutment (19, 20) being provided before the discharge station (7) and beyond the loading station (8) resepctively, for engaging a protruding part (21, 15) of the lever in order to first shift the lever longitudinally and thereafter retain the lever so that by the continued travel of the conveyor, the lever is subsequently tilted so as to move the cover into one of its end positions.

* * * * *